(12) United States Patent
Soppe

(10) Patent No.: US 6,910,444 B1
(45) Date of Patent: Jun. 28, 2005

(54) HEATED MILK SUPPLY SYSTEM FOR LIVESTOCK

(76) Inventor: John Soppe, 1942 Honey Creek Rd., Manchester, IA (US) 52057

(*) Notice: Subject to any disclaimer, the term of this patent is extended or adjusted under 35 U.S.C. 154(b) by 0 days.

(21) Appl. No.: 10/249,194

(22) Filed: Mar. 21, 2003

(51) Int. Cl.⁷ .............................................. A01K 7/06
(52) U.S. Cl. ...................................................... 119/73
(58) Field of Search .............................. 119/73, 74, 75, 119/72.5

(56) References Cited

U.S. PATENT DOCUMENTS

| | | | |
|---|---|---|---|
| 2,479,355 A | * | 8/1949 | Hemker .................... 119/73 |
| 2,613,311 A | * | 10/1952 | Goff .......................... 119/73 |
| 3,233,864 A | | 2/1966 | Behlen et al. |
| 3,285,226 A | | 11/1966 | Schuler |
| 3,313,272 A | | 4/1967 | Moloney |
| 3,812,823 A | * | 5/1974 | Ridder et al. ............. 119/54 |
| 4,141,321 A | | 2/1979 | Wolf |
| 4,269,147 A | | 5/1981 | Vorbeck |
| 4,542,034 A | * | 9/1985 | Aule et al. ................ 426/522 |
| 4,715,323 A | | 12/1987 | Malestein |
| 4,757,784 A | | 7/1988 | Hammer |
| 4,779,571 A | | 10/1988 | Row |
| 4,986,221 A | * | 1/1991 | Shaw ........................ 119/73 |
| 4,993,365 A | | 2/1991 | Weerstra |
| 5,070,817 A | * | 12/1991 | Momont .................... 119/75 |
| 5,115,764 A | | 5/1992 | Soppe |
| 5,184,570 A | * | 2/1993 | Hostetler .................. 119/72 |
| 5,452,683 A | * | 9/1995 | Poffenroth ................. 119/73 |
| 5,474,029 A | * | 12/1995 | Hofer ......................... 119/73 |
| 5,503,064 A | * | 4/1996 | Scheel et al. ............. 99/453 |
| 5,709,170 A | * | 1/1998 | Gerbo et al. ............. 119/72.5 |
| 5,740,760 A | * | 4/1998 | Winebrenner ............. 119/73 |
| 5,809,935 A | * | 9/1998 | Kolterman et al. ........ 119/74 |
| 6,619,232 B2 | * | 9/2003 | Johnston et al. ........... 119/73 |

FOREIGN PATENT DOCUMENTS

| | | |
|---|---|---|
| DE | 3419840 | 5/1984 |
| DE | 3419842 | 11/1985 |
| GB | 1237883 | 6/1971 |

* cited by examiner

Primary Examiner—Robert P. Swiatek
(74) Attorney, Agent, or Firm—James C. Nemmers

(57) ABSTRACT

A system for supplying heated milk or other liquids to individual drinkers from which animals, particularly baby pigs, can drink on a need basis by actuating a valve in the drinker that allows the milk to flow into the drinker. The system has a plurality of drinkers within a closed system in which the milk is supplied from a reservoir, heated to a minimum predetermined temperature range and pumped to each drinker which is positioned so that milk is continuously circulated through the drinker any time the circulating pump is running. This not only keeps the heated milk from spoiling, but it also prevents the drinkers from becoming clogged and permits the entire system to be cleaned in place.

1 Claim, 1 Drawing Sheet ated milk supply system for
livestock

BACKGROUND OF INVENTION

Livestock producers frequently utilize automatic feeding systems to assure that the animals, especially small animals, are always supplied with adequate feed for healthy and rapid growth. In the case of baby pigs, the feed is frequently supplied in a liquid form, usually milk or a milk replacer. The liquid feeding systems that are presently in use provide the liquid to individual drinker units from a supply tank, the drinker units permitting the animals to drink on a need basis by actuating a valve that allows the milk to flow into the unit. In presently known systems, each drinker unit is connected by a vertical line to an overhead trunk or supply line, the milk being supplied to each drinker unit. An example of such a system is shown in my U.S. Pat. No. 5,115,764. Although systems of this type assure a constant supply of the liquid feed to the animals, when the ambient air temperature is low and remains low for an extended period of time, the temperature of the liquid will also be lowered and may not be as palatable to small, baby animals who prefer warm, liquid feed. The baby animals may therefore not consume the amount of liquid feed desired for proper growth.

Therefore, there is a need for an improved system for supplying heated liquid feed to individual drinker units from a supply source, which system will provide the heated liquid feed to the drinker units at a temperature desired by the baby animals.

Because the liquid feed is circulated under pressure through all of the lines to prevent the liquid feed from remaining in any portion of the lines and thus becoming stale or clogging the lines, there is a need for a system in which the liquid feed is heated without creating a hazard if the controls should fail and the heating means fail to shut down at the proper time.

Because systems of this type must be regularly cleaned, and if difficult to clean may be neglected by the livestock producer, there is also a need for a heated system which can be easily cleaned in place.

SUMMARY OF INVENTION

The milk supply system of the invention is a closed, pressurized system in which each individual drinker is positioned in the system so that the liquid feed can be continuously circulated through the drinkers at all times when the circulating pump is running. The individual drinkers are serially connected in the closed, pressurized system and are supplied with fresh liquid feed from a supply source. A heating unit is included in the milk supply to the drinkers, and the pump and heating unit are interconnected so that heating unit is operable only when the pump is operating. Thus, heated liquid feed is always supplied in the closed system containing the drinker units.

DETAILED DESCRIPTION

Figure 1:
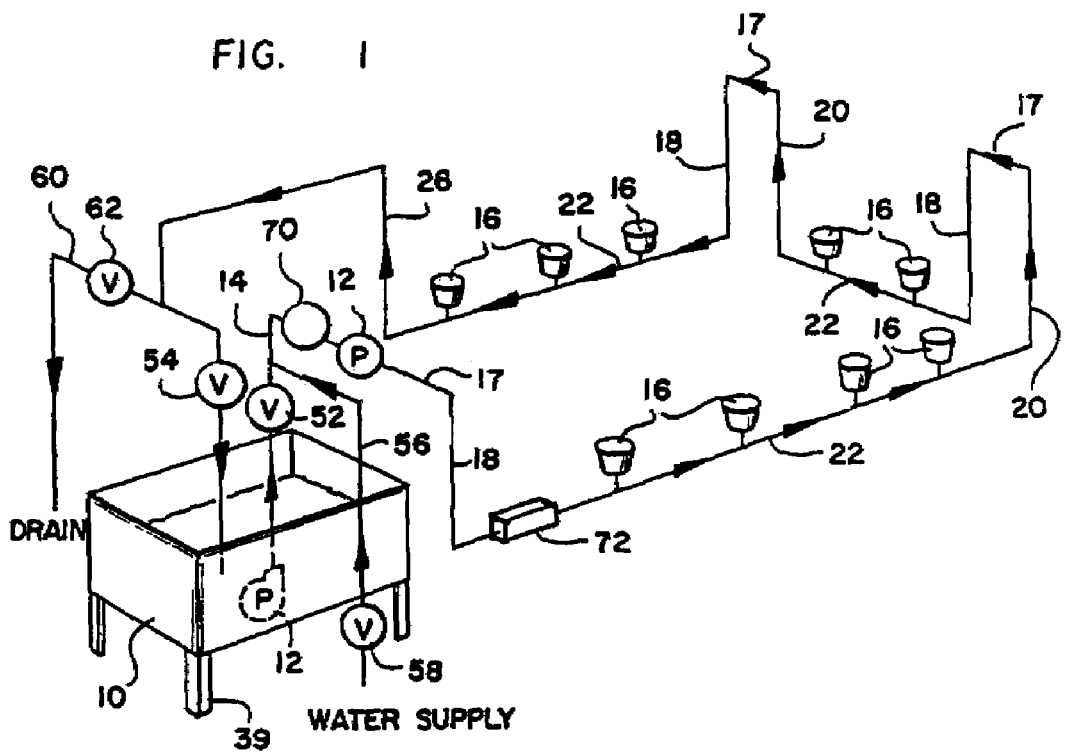
FIG. 1 is a schematic view in perspective of the system of the invention.
Figure 2:
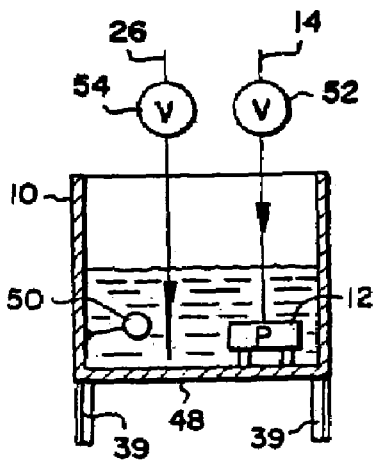
FIG. 2 is an elevational view, partially in section, of the supply tank showing the position of the supply and return lines.
Figure 3:
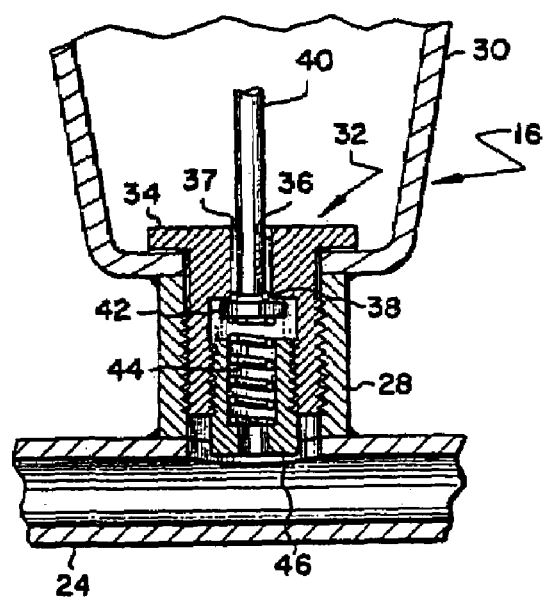
FIG. 3 is a sectional view of an individual drinker unit.

Referring first to FIG. 1, the system of the invention provides for delivery of the liquid feed, such as milk, from a source contained in a supply tank 10. The milk in tank 10 is circulated throughout the system by a circulating pump 12 through a supply line 14. In FIG. 1, pump 12 is shown as a submersible pump and also as being located outside of tank 10. Location of the pump 12 is preferably outside the tank 10 in supply line 14 for reasons explained more fully hereinafter. Supply line 14 follows a pattern consisting of a plurality of vertical loops as shown in FIG. 1. In other words, the supply line 14 carries the milk out of the tank 10 usually upwardly to an upper level several feet above the floor level of the building in which the system is installed, and then around the building at this upper level while dropping downwardly to the drinker units 16 positioned at or near the bottom of each of the vertical loops. The number and location of the vertical loops will depend in large part on the particular layout of the building in which the system is installed. The upper portions of the vertical loops have been termed the trunk lines 17, and they are usually located near the ceiling of the building so as to be out of the way. As shown in FIG. 1, each vertical loop of the supply line 14 has a downwardly extending line 18 and an upwardly extending line 20 which are connected at their lower ends by a bottom line 22 in which is connected one or more animal actuated drinker units 16. Although for purposes of description I have broken the supply line 14 into segments and applied descriptive terminology to each segment, it will be evident from FIG. 1 that the supply line 14 is a continuous supply conduit through which the milk flows in the direction indicated by the arrows until the supply line 14 passes through the last drinker unit 16 from where the milk then flows through a return line 26 that extends to the bottom of the supply tank 10 (FIG. 2). It is essential the portion of return line 26 following the last drinker unit 16 be at a level above the level of the discharge opening 37 from valve unit 32. Also, as indicated in FIG. 1, there are a plurality of vertical loops in the supply line 14, usually with one or more drinker units 16 in the bottom line 22 of each loop. The drinker units 16 normally are located at or near the floor level at a convenient height for the animals for which the system is installed. The drinker units 16 may be of any suitable type in which the animal actuates a valve to open the valve and allow the liquid to be released so that the animal can drink it. In FIG. 3, there is shown a preferred drinker unit 16 which is installed in the vertical leg 28 of a tee 24 in the bottom line 22 of the supply line 14. Each drinker unit 16 has a cup 30 to contain the milk and a valve unit indicated generally by the reference numeral 32 The valve unit consists of a retainer 34 threaded into the leg 28, the retainer 34 having a vertical passageway 36 with a discharge opening 37 at its upper end and an O-ring 38 at its lower end. Extending through the vertical passageway 36 is an actuator 40 which has a seat 42 that is engaged normally with the O-ring 38, the seat 42 being normally held against the O-ring 38 by a spring 44 seated in a spring retainer 46 that is threaded into the lower end of the retainer 34. Thus, when the animal moves the actuator 40, the seal between the seat 42 and O-ring 38 will be broken, and the milk flowing through the supply line 14 will be allowed to flow into the cup 30, since the milk is constantly under pressure. In this regard, the lowest level of the milk in the supply tank 10 is preferably above the discharge opening 37 from the vertical passageway 36, and tank 10 therefore may be elevated on legs 39. Referring now to FIGS. 1 and 2, it will be seen that the return line 26 terminates near the bottom wall 48 of the tank 10 so that the discharge end of the return line 26 should always be below the liquid level in the supply tank 10. A pressure operated switch 50 is also provided to stop the pump 12 when the tank 10 is empty. This prevents the pump 12 from operating when there is insufficient liquid in the tank 10 thereby preventing damage to the pump.

When the system is used to feed baby pigs, it is important to have the liquid feed, such as milk, at a temperature greater than about 70° F. If the milk is too cool, the baby pigs won't drink as much as they should. Therefore, there is provided in the system a means to heat the milk to the desired temperature. In one embodiment, the pump 12 is located outside the tank 10 rather than in the tank 10, and an immersion heater 70 is positioned in the tank 10 or in the supply line 14 upstream from the pump 12 and downstream from the tank 10. The immersion heater 70 is of any suitable type well know to those skilled in the art in which the heating element is submerged in the liquid flowing through the supply line 14. Such heaters are typically thermostatically controlled. In another embodiment, a heater 72 is positioned along the supply line 14. In the embodiment shown in the drawings, heater 72 is positioned downstream from the pump 12 and ahead of the first drinking unit 16, but it will be understood that heater 72 can be positioned anywhere in the supply line 14 and that there may be more than one heater 72. Heater 72 is preferably of the resistance-heating cable type that can be wrapped around the outside of the portion 17 of the supply line 14 close to the first drinking unit 16. With this type of heater 72 the heating cable can be wrapped around the supply line 14 at a spacing that will provide the desired means to heat the milk flowing through the supply line 14 to the desired temperature. Moreover, the rope type heater 72 provides flexibility because this type of heater can easily be located in more than one place along the supply line 14 of the system. In large systems with numerous drinker units 16, more than one heater 72 may be necessary to maintain the desired milk feeding temperature to all the units 16. However, it is also important not to overheat the milk or it can burn, affecting the taste and possibly injuring the baby pigs.

It will also be understood that the tank 10 can be externally heated or the milk can be preheated and supplied to the system. It is important only that the milk be at the proper temperature when it reaches the drinking units 16 and heated at a rate that does not damage the milk.

With the addition of a heater 70 or 72 into the system, the heaters preferably are connected so as to be energized only if the pump 12 is operating, since it is important to heat milk only if it is flowing through the system for feeding, unless the heater 70 is immersed in the tank 10 and is thermostatically controlled. If the heaters are on and not thermostatically controlled, and the milk is not circulating, the milk can be damaged and may plug the lines.

Also, with reference to FIGS. 1 and 2, there is illustrated as a part of the schematic of FIG. 1 a valve arrangement which permits the system to operate efficiently with a smaller less expensive pump, and which also provides the means for conducting a thorough cleaning and rinsing of the entire system in a simple, efficient and easy-to-operate manner. In FIG. 1, there is shown a valve 52 in the supply line 14, the valve 52 being upstream from all of the drinker units 16 Similarly, a valve 54 is located in the return line 26 just upstream from where the return line 26 discharges into the tank 10. In order to provide for cleaning the system and for purging air from the system, a water supply line 56 is connected to a pressurized external water source, the line 56 being connected to the milk supply line 14 downstream from valve 52. Water supply line 56 also contains a valve 58 so that the supply of water through line 56 can be controlled. Similarly, a drain line 60 is connected to the return line 26 just upstream from the valve 54, the drain line 60 also containing a valve 62, with the drain line 60 discharging into a suitable drain. The various valves just described can be manually operated, or if desired, the various valves can be automatically operated according to a predetermined program dictated by a control system (not shown). Such a control system does not form a part of the invention, since such a system is within the skill of a person ordinarily skilled in the art knowing the desired sequence of operation. If the system is not in use, normally all four valves 52, 54, 58 and 62 will be closed. Before placing the system in operation, it is important that the supply line 14 and return line 26 be free from any air pockets Therefore, the drain valve 62 and water supply valve 58 are opened while keeping the valves 52 and 54 closed. Valve 52 is momentarily opened to allow a small amount of water to flow back through pump 12 and purge any air in the portion of supply line 14 between the valve 52 and supply tank 10. Valve 52 is then closed to allow the water from the external water supply source to flow through the entire system and be discharged through the drain line 60 into the drain. Flow of the water should be continued until no air bubbles are visible at the drain. At this time, the water supply valve 58 is closed. The tank 10 is then filled with the desired liquid feed, such as milk, and the circulating pump 12 started. Simultaneously with the starting of the pump 12, the valve 52 in the supply line 14 is opened. This allows milk to start flowing through the supply line 14, and since the valve 54 is still closed, the liquid in the supply line 14 will be discharged from the drain line 60. Of course, when the pump 12 was started, the supply line 14 was filled with the water used to purge the system, and therefore the operator should observe the liquid being discharged from the drain line 60 until all of the water has been discharged and milk is being discharged into the drain. At this time, valve 62 is closed and valve 54 opened. As long as there is sufficient milk in the tank 10, the milk will continue to be circulated throughout the system through supply line 14 and return line 26. Unless the level of milk in the tank 10 falls below the level controlled by the pressure controlled switch 50, the circulating pump will continue to run. Thus, the milk will be continuously pumped through the system and through each of the drinker units 16, thereby preventing any of the milk from sitting at any point and becoming stale.

Periodically, it is necessary to clean the system. This is done in the following manner. With the valves 52 and 62 open and valves 54 and 58 closed, and with the pressure controlled switch 50 activated, all of the milk is pumped from the system and from the tank 10 through the drain line 60. If desired, this milk could be discharged from the drain line 60 into a container for future use. In any event, the pump 12 is operated until such time as milk is no longer being discharged from the system. At this time, the pump 12 is shut off. If desired, the tank 10 can be rinsed in any suitable manner using, for example, a hose connected to a water source, after which the rinsing liquid is either manually drained from the tank 10 or drained using the circulating pump 12. The valve 52 is then closed and the water supply valve 58 opened. With valve 54 still closed and valve 62 and the drain line 60 open, the system is flushed by allowing the water from the pressurized water supply to flow to flow into the system through water supply line 56. Flushing with water should continue until the operator determines that the system has been adequately flushed. Then, the water supply valve 58 is closed and the valve 52 in the supply line 14 opened. In order to remove all residue of the liquid feed from the system, a liquid cleaning solution may be added to the tank 10, the pump 12 started and valve 54 opened and drain valve 62 closed. This cleaning solution is circulated throughout the system for the desired amount of time. To discharge the cleaning solution from the system, valve 54 is closed and drain valve 62 opened. While the cleaning solution is being discharged into the drain, the tank 10 may be rinsed in any suitable manner, such as by using a hose connected to an external water supply. After the tank 10 is rinsed and emptied by pump 12, the pump 12 is stopped, valve 52 closed and water supply valve 58 opened to flush the entire system with fresh clean water. As soon as the water being discharged from the drain line 60 is clear, drain valve 62 is closed and valve 54 opened momentarily to flush that portion of return line 26 downstream from valve 54. Then, all the valves are closed and the system is again ready for use.

Periodically, the drinker units 16 may be cleaned by either removing them and cleaning them or by manually moving the actuator 40 in each drinker unit 16 during the cleaning cycle. If the drinker units 16 are left in place for cleaning, the cups 30 can be manually flushed in any suitable manner, such as by pressure washing at the time the facility is cleaned.

It will be evident from the foregoing description that the system of the invention provides for continuous circulation of the liquid feed or milk throughout the system thereby preventing the milk from ever becoming stale. Usually, the room temperature in a building where a system like this is installed is around 72 degrees, but if needed because the liquid feed temperature drops, the heater 70 or heater 72 may be turned on while the pump 12 is operating. As long as an adequate amount of milk is maintained in the tank 10, the supply line 14 will always be full, and since the milk in the line is always under a slight pressure, there is no place in the system where the milk can become at rest and become stale. Also, the system lends itself to easy and thorough cleaning in place with the valve arrangement described.

Although the system of the invention has been described in connection with preferred embodiments thereof, it will be evident to those skilled in the art that various revisions and modifications can be made to the preferred embodiments without departing from the spirit and scope of the invention. It is my intention, however, that all such revisions and modifications as are obvious to those skilled in the art will be included within the scope of the following claims.

What is claimed is:

1. An apparatus for supplying heated liquid feed to multiple drinkers from which animals can drink on a need basis, said apparatus comprising:
   a plurality of drinkers each having an inlet and an outlet with a normally-closed animal-actuated valve between the inlet and the outlet to direct the liquid feed to the drinker when the valve is actuated by an animal;
   a reservoir for supplying the liquid feed, the lowest level of the reservoir being at a level above the level of the drinkers;
   a closed liquid line leading from the reservoir to the drinkers and returning from the drinkers to the reservoir, the portion of the liquid line from the reservoir carrying the liquid feed upwardly and then downwardly to the drinkers while the portion of the liquid line returning from the drinkers to the reservoir carries the liquid feed upwardly from the drinkers and then downwardly to the reservoir, the drinkers being serially connected in the liquid line;
   a pump operable for moving the liquid feed under pressure through the liquid line and through the drinkers;
   each drinker having its inlet connected directly to the closed liquid line so that the liquid feed in said line continuously flows under pressure through the inlet and to the animal-actuated valve at all times when the liquid feed is moved through the liquid line by the pump; and
   one or more heating units of the resistance-heating rope type located in the liquid line downstream from the pump and upstream from one or more drinkers to heat the liquid feed at the plurality of drinkers to a predetermined temperature greater than about 70 degrees Fahrenheit suitable for feeding the animals but at a temperature that will not damage the liquid feed, the pump and the one or more heating units being operatively connected so that no heating unit can be energized unless the pump is operating.

\* \* \* \* \*